(12) United States Patent
Kudo et al.

(10) Patent No.: US 11,182,364 B2
(45) Date of Patent: Nov. 23, 2021

(54) DATA ANALYSIS SUPPORT APPARATUS AND DATA ANALYSIS SUPPORT METHOD

(71) Applicant: Hitachi, Ltd., Tokyo (JP)

(72) Inventors: Fumiya Kudo, Tokyo (JP); Hideki Hayashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 412 days.

(21) Appl. No.: 16/125,840

(22) Filed: Sep. 10, 2018

(65) Prior Publication Data

US 2019/0286724 A1   Sep. 19, 2019

(30) Foreign Application Priority Data

Mar. 13, 2018   (JP) .............................. JP2018-045187

(51) Int. Cl.
*G06F 16/22* (2019.01)
*G06N 5/02* (2006.01)
*G06F 16/25* (2019.01)

(52) U.S. Cl.
CPC ............ *G06F 16/22* (2019.01); *G06F 16/254* (2019.01); *G06N 5/02* (2013.01)

(58) Field of Classification Search
CPC .......... G06F 16/22; G06F 16/254; G06N 5/02
USPC ........................................................ 707/602
See application file for complete search history.

(56) References Cited

U.S. PATENT DOCUMENTS

| | | | |
|---|---|---|---|
| 2005/0157908 A1 | 7/2005 | Matsugu et al. | |
| 2013/0110409 A1 | 5/2013 | Sakurada | |
| 2013/0243077 A1 | 9/2013 | Mitarai | |
| 2014/0310235 A1* | 10/2014 | Chan | G06F 11/3003 |
| | | | 707/603 |
| 2016/0217384 A1* | 7/2016 | Leonard | G06N 5/02 |
| 2017/0220938 A1* | 8/2017 | Sainani | G06F 16/2471 |
| 2018/0046926 A1* | 2/2018 | Achin | G06Q 10/04 |
| 2018/0175790 A1* | 6/2018 | Sanfilippo | H02S 50/10 |
| 2019/0171494 A1* | 6/2019 | Nucci | G06N 5/003 |
| 2019/0197413 A1* | 6/2019 | Veasey | G06F 16/252 |

FOREIGN PATENT DOCUMENTS

| | | |
|---|---|---|
| JP | 2000-066933 A | 3/2000 |
| JP | 2005-202653 A | 7/2005 |
| JP | 2014-030164 A | 2/2014 |
| JP | 2016-048251 A | 4/2016 |

* cited by examiner

*Primary Examiner* — Robert W Beausoliel, Jr.
*Assistant Examiner* — Arthur Ganger
(74) *Attorney, Agent, or Firm* — Mattingly & Malur, PC (57) ABSTRACT

Series data in a table form and which includes a plurality of records each having a value of a response variable, response variable series identification information, a value of an explanatory variable, and explanatory variable series identification information identifying series of the explanatory variable associated with one another is stored. An analytical record that is any of the records and that contains the value of the response variable or the value of the explanatory variable possibly influencing the response variable at a time of analyzing the response variable is identified; and an additional record having the value of the response variable or the value of the explanatory variable in the identified analytical record associated with the value of the response variable in a predetermined record that is any of the records is generated, and analytical series data obtained by adding the generated additional record to the series data is generated.

13 Claims, 11 Drawing Sheets

SERIES DATA                                                          181

| PRODUCTION UNIT ID (1811) | DATE $t_1$ (1812) | PRODUCTION PROGRESS EVALUATION VALUE $y$ (1813) | TIME $t_2$ (1814) | VARIOUS CONTROL PARAMETERS (1815) ||||
|---|---|---|---|---|---|---|---|
| | | | | $x_1$ | $x_2$ | ... | $x_n$ |
| 100 | 2017/12/05 | 2 | 12:10 | 12.1 | A | ... | 2 |
| 100 | 2017/12/07 | 3 | 10:35 | 12.4 | B | ... | 4 |
| 100 | 2017/12/07 | 3 | 10:50 | 12.4 | B | ... | 5 |
| 100 | 2017/12/08 | 6 | 08:45 | 12.2 | D | ... | 7 |
| 101 | 2017/12/13 | 2 | 13:20 | 12.0 | C | ... | 2 |
| 101 | 2017/12/18 | 4 | 15:00 | 14.4 | C | ... | 2 |
| :: | :: | :: | :: | :: | :: | :: | :: |
| 500 | 2017/12/28 | 5 | 18:00 | 10.1 | A | ... | 4 |

FIG. 4

ITEM INFORMATION         182

| ATTRIBUTE INFORMATION (1821) | ITEM NAME (1822) |
|---|---|
| CONSECUTIVE UNIT | PRODUCTION UNIT ID |
| RESPONSE VARIABLE | PRODUCTION PROGRESS EVALUATION VALUE $y$ |
| TIME OF RESPONSE VARIABLE | TIME $t_1$ |
| EXPLANATORY VARIABLE | VARIOUS CONTROL PARAMETERS |
| TIME OF EXPLANATORY VARIABLE | TIME $t_2$ |

FIG.5

ANALYTICAL RECORD IDENTIFICATION INFORMATION 184

| ITEM NAME | RANGE IDENTIFICATION INFORMATION |
|---|---|
| DATE $t_i$ | $\tau_{start} \sim \tau_{end}$ |

FIG.6

ANALYTICAL SERIES DATA 185

| PRODUCTION UNIT ID 1851 | DATE $t_i$ 1852 | PRODUCTION PROGRESS EVALUATION VALUE y 1853 | DATE $t_i'$ 1854 | VARIOUS CONTROL PARAMETERS 1855 ||||
|---|---|---|---|---|---|---|---|
| | | | | $x_1$ | $x_2$ | ... | Ave($x_n$) |
| 100 | 2017/12/05 | 2 | 2017/12/05 | 9.1 | A | ... | 2 |
| :: | :: | :: | :: | :: | :: | ... | :: |
| 100 | 2017/12/07 | 3 | 2017/12/07 | 12.4 | B | ... | 5 |
| 100 | 2017/12/08 | 6 | 2017/12/05 | 12.1 | A | ... | 2 |
| 100 | 2017/12/08 | 6 | 2017/12/07 | 12.4 | B | ... | 4.5 |
| 100 | 2017/12/08 | 6 | 2017/12/08 | 12.2 | D | ... | 7 |
| 101 | 2017/12/13 | 2 | 2017/12/13 | 12.0 | C | ... | 2 |
| :: | :: | :: | :: | :: | :: | ... | :: |
| 500 | 2017/12/28 | 5 | 2017/12/28 | 10.1 | A | ... | 4 | f

SERIES DATA    181
                815

| ID | TIME $t_y$ | y | TIME $t_{x1}$ | VARIOUS PARAMETERS | | |
|---|---|---|---|---|---|---|
| | | | | $x_1$ | ... | $x_n$ |
| 1 | 10:00 | 2 | 09:25 | 0.1 | ... | Y |
| 1 | 10:00 | 2 | 09:43 | 0.4 | ... | Z |
| 1 | 10:00 | 2 | 09:55 | 0.7 | ... | Z |
| 2 | 11:00 | 4 | 10:01 | 1.0 | ... | A |
| : | : | : | : | : | : | : |

SERIES DATA 181

| $ID_y$ | TIME $t_y$ | y | $ID_x$ | VARIOUS PARAMETERS | | |
|---|---|---|---|---|---|---|
| | | | | $x_1$ | ... | $x_n$ |
| 1 | 10:01 | 2 | 09:25 | 1.0 | ... | A |
| 1 | 10:01 | 2 | 09:43 | 2.0 | ... | B |
| 1 | 10:01 | 2 | 09:55 | 3.0 | ... | D |
| 2 | 10:05 | 4 | 10:01 | 9.0 | ... | B |
| : | : | : | : | : | : | : |

⇩ AGGREGATE PROCESS

AGGREGATED DATA 183

| $ID_y$ | TIME $t_y$ | y | $Avg(x_1)$ | ... | $x_n(A)$ |
|---|---|---|---|---|---|
| 1 | 10:01 | 2 | 2.0 | ... | 1 |
| 1 | 10:01 | 2 | 4.5 | ... | 0 |
| 1 | 10:01 | 2 | 5.0 | ... | 0 |
| 2 | 10:05 | 4 | 9.0 | ... | 1 |
| : | : | : | : | : | : |

SERIES DATA 181

| ID | TIME $t_y$ | y | VARIOUS PARAMETERS | | |
|---|---|---|---|---|---|
| | | | $x_1$ | ... | $x_n$ |
| 1 | 10:01 | 2 | 1.0 | ... | A |
| 2 | 10:05 | 4 | 2.0 | ... | B |
| 3 | 10:21 | 6 | 3.0 | ... | B |
| 4 | 10:45 | 8 | 4.0 | ... | D |
| 5 | 11:06 | 1 | 9.0 | ... | E |
| 6 | 11:30 | 5 | 8.0 | ... | F |
| : | : | : | : | : | : |

⇩

ANALYTICAL SERIES DATA 185

| ID | TIME $t_y$ | y | TIME $t_{x1}$ | VARIOUS PARAMETERS | | |
|---|---|---|---|---|---|---|
| | | | | $x_1$ | ... | $x_n$ |
| 1 | 10:01 | 2 | 09:25 | 0.1 | ... | Y |
| 1 | 10:01 | 2 | 09:43 | 0.4 | ... | Z |
| 1 | 10:01 | 2 | 09:55 | 0.7 | ... | Z |
| 1 | 10:01 | 2 | 10:01 | 1.0 | ... | A |
| 2 | 10:05 | 4 | 10:01 | 1.0 | ... | A |
| 2 | 10:05 | 4 | 10:05 | 2.0 | ... | B |
| 3 | 10:21 | 6 | 10:05 | 2.0 | ... | B |
| 3 | 10:21 | 6 | 10:21 | 3.0 | ... | B |
| : | : | : | : | : | : | : |

DATA ANALYSIS SUPPORT APPARATUS AND DATA ANALYSIS SUPPORT METHOD

CROSS-REFERENCE TO RELATED APPLICATION

This application claims priority pursuant to 35 U.S.C. § 119 from Japanese Patent Application No. 2018-045187, filed on Mar. 13, 2018, the entire disclosure of which is incorporated herein by reference.

BACKGROUND

The present invention relates to a data analysis support apparatus and a data analysis support method.

RELATED ART

Japanese Patent Application Publication No. 2000-66933 (JP2000-66933A) describes the following respects. "The latest data and time series data of a plurality of past points are allowed to coexist in the same table," and "time series table definition means generates a validity term index defining end time and start time and a unique index including the definition of the end time. Time series table updating means controls the preparation of time series data based on a value at stored time and the insertion of the data into a time series table at the time of receiving an insert/update/delete instruction for latest data, and executes the insert/update/delete of the latest data and updates both the indexes. Time series table retrieving means considers retrieving time for a retrieving instruction, adds 'a condition for selecting only intra-table data at specific time' to a retrieving condition, and retrieves the time series table under the retrieving condition by utilizing both the indexes."

SUMMARY

In recent years, the development of systems for making positive use of data such as big data accumulated in organizations such as companies is actively underway. In many cases, data to be analyzed, for example, industrial big data is data having a structure such that consecutively observed values are correlated (hereinafter, referred to as "series data") such as data having time sequence (hereinafter, referred to as "time series data") and data having spatial sequence (hereinafter, referred to as "spatial data"). Demand has risen lately for a more advanced data analysis technique using such series data with a view to improving accuracy for a predictive model for achievement, a key performance indicator (KPI), or the like.

At a time of data analysis, an analyst needs to extract a series characteristic amount to perform calculation of an amount of change of an explanatory variable for large amounts of data containing various information, extraction of factors that have an influence in a temporally delayed fashion, and the like. However, the series data given as data to be analyzed does not often have a structure (table form) suited for extraction of the series characteristic amount; thus, the analyst disadvantageously needs to perform preprocessing such as data transformation on large amounts of data and takes on a heavy workload.

JP2000-66933A describes a technique intended to allow the latest data and the time series data of the plurality of past points to coexist in the same table. However, JP2000-66933A does not at all disclose a mechanism based on viewpoints of improving efficiency for preprocessing necessary for extracting the series characteristic amount.

The present invention has been made in the light of such a background and an object of the present invention is to provide a data analysis support apparatus and a data analysis support method for supporting preprocessing performed at a time of analyzing series data.

According to one aspect of the present invention for achieving the object, a data analysis support apparatus, which is an information processing apparatus having a processor and a storage device, includes: a storage unit that stores series data which is data in a table form and which includes a plurality of records each having a value of a response variable, response variable series identification information that is information identifying series of the response variable, a value of an explanatory variable, and explanatory variable series identification information that is information identifying series of the explanatory variable associated with one another; an analytical record identification unit that identifies an analytical record that is any of the records and that contains the value of the response variable or the value of the explanatory variable possibly influencing the response variable at a time of analyzing the response variable; and an analytical series data generation unit that generates an additional record which is a record having the value of the response variable or the value of the explanatory variable in the identified analytical record associated with the value of the response variable in a predetermined record that is any of the records, and that generates analytical series data which is data obtained by adding the generated additional record to the series data.

Other objects disclosed in the present application and methods of achieving the objects are readily apparent from a section of an embodiment and drawings.

According to the present invention, it is possible to support preprocessing such as data transformation performed at a time of analysis of series data.

DETAILED DESCRIPTION OF THE EMBODIMENTS

An embodiment will be described hereinafter with reference to the drawings. In the following description, same or similar configurations are denoted by the same reference characters and repetitive description is often omitted.

Figure 1:
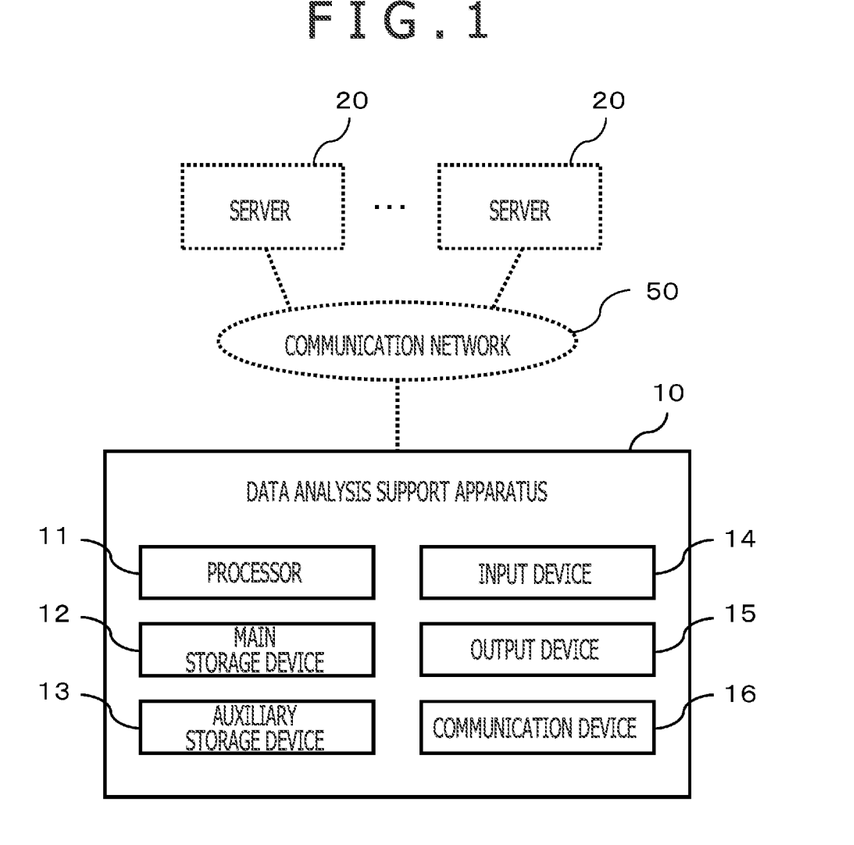
FIG. 1 illustrates a schematic configuration of a data analysis support apparatus.

FIG. 1 illustrates a schematic configuration of a data analysis support apparatus 10 (solid line section in FIG. 1) to be described as an embodiment. The data analysis support apparatus 10 performs collection of data to be analyzed, management of the collected data, an ETL process (extracting data (Extract), transforming data (Transform), and loading data (Load)), an analysis process, a visualization process, and the like, and supports various processes and work necessary at a time of data analysis.

The data analysis support apparatus 10 is used for data analysis on various information including, for example, tracking information (an access history, an action history, and the like) about each user who uses a web content, information acquired from a point of sale (POS) system in retail business, information for marketing research, control information and log information acquired from manufacturing machines and sensors in factory internet of things (IoT), transaction information in financial business, and transport information in physical distribution business. It is assumed in the present embodiment that the data to be analyzed by the data analysis support apparatus 10 is data having a structure such that consecutively observed values are correlated (hereinafter, referred to as "series data") such as data having time sequence (hereinafter, referred to as "time series data") and data having spatial sequence (hereinafter, referred to as "spatial series data").

As illustrated in FIG. 1, the data analysis support apparatus 10 includes a processor 11, a main storage device 12, an auxiliary storage device 13, an input device 14, an output device 15, and a communication device 16, and the data analysis support apparatus 10 functions as an information processing apparatus (computer). It is noted that the data analysis support apparatus 10 may be realized, for example, using virtual information processing resources such as a cloud server provided by a cloud system. Alternatively, the data analysis support apparatus 10 may be realized, for example, by a plurality of information processing devices operating in cooperation with one another and communicably connected to one another.

The processor 11 is configured using, for example, a central processing unit (CPU), an micro processing unit (MPU), or a graphics processing unit (GPU). The main storage device 12 is a device that stores programs and data, and examples of the main storage device 12 include a read only memory (ROM) (such as a mask read only memory (mask ROM) and a programmable ROM (PROM)), and a random access memory (RAM) (such as a static random access memory (SRAM), an NVRAM (Non Volatile RAM), and a dynamic random access memory (DRAM). Examples of the auxiliary storage device 13 include a hard disk drive, a flash memory, a solid state drive (SSD), and an optical storage device (such as a compact disc (CD) and a digital versatile disc (DVD)). Programs and data stored in the auxiliary storage device 13 are read into the main storage device 12 as needed.

The input device 14 is a user interface that receives information input by a user, and examples of the input device 14 include a keyboard, a mouse, a card reader, and a touch panel. The output device 15 is a user interface that provides information to the user, and examples of the output device 15 include a display device that visualizes various information (such as a liquid crystal monitor, a liquid crystal display (LCD), and a graphic card), an audio output device (a loudspeaker), and a printer. The communication device 16 is a communication interface that communicates with other devices via a communication network 50, and examples of the communication device 16 include a network interface card (NIC), a universal serial interface (USB) module, and a serial communication module.

The data analysis support apparatus 10 is communicably connected to servers 20 via, for example, the communication network 5. Examples of the communication network 5 include the Internet and a common carrier leased line. Examples of the servers 20 include a Web server, an application programming interface (API) server, a social network service (SNS) server, an open data server, a POS server installed in a shop or the like, and an edge server and a sensor server installed in a factory or the like. The data analysis support apparatus 10 acquires data to be analyzed from each server 20 by any of methods that include, for example, data transfer, download, upload, and scraping. It is noted that the data analysis support apparatus 10 may acquire series data by a method other than those described above. For example, the data analysis support apparatus 10 may acquire the data to be analyzed via the input device 14.

The data analysis support apparatus 10 performs an analysis process (such as classification, retrieval, analysis, and machine learning) on the acquired series data, extraction of a characteristic amount of the series data (hereinafter, referred to as "series characteristic amount"), identification of factors involved in improvement of achievement and key performance indicator (KPI), prediction of a response variable, and the like. Specific examples of the series data include various log information (such as factory operation log information, control log information and running log information about production facilities, operation log information about an automatic teller machine (ATM), and production status logs and stock status management logs about commodity products), and time series data related to a social trend (such as statistical information provided by information dissemination bodies of the government and the like, articles from a social networking service (SNS), and news articles).

Figure 2:
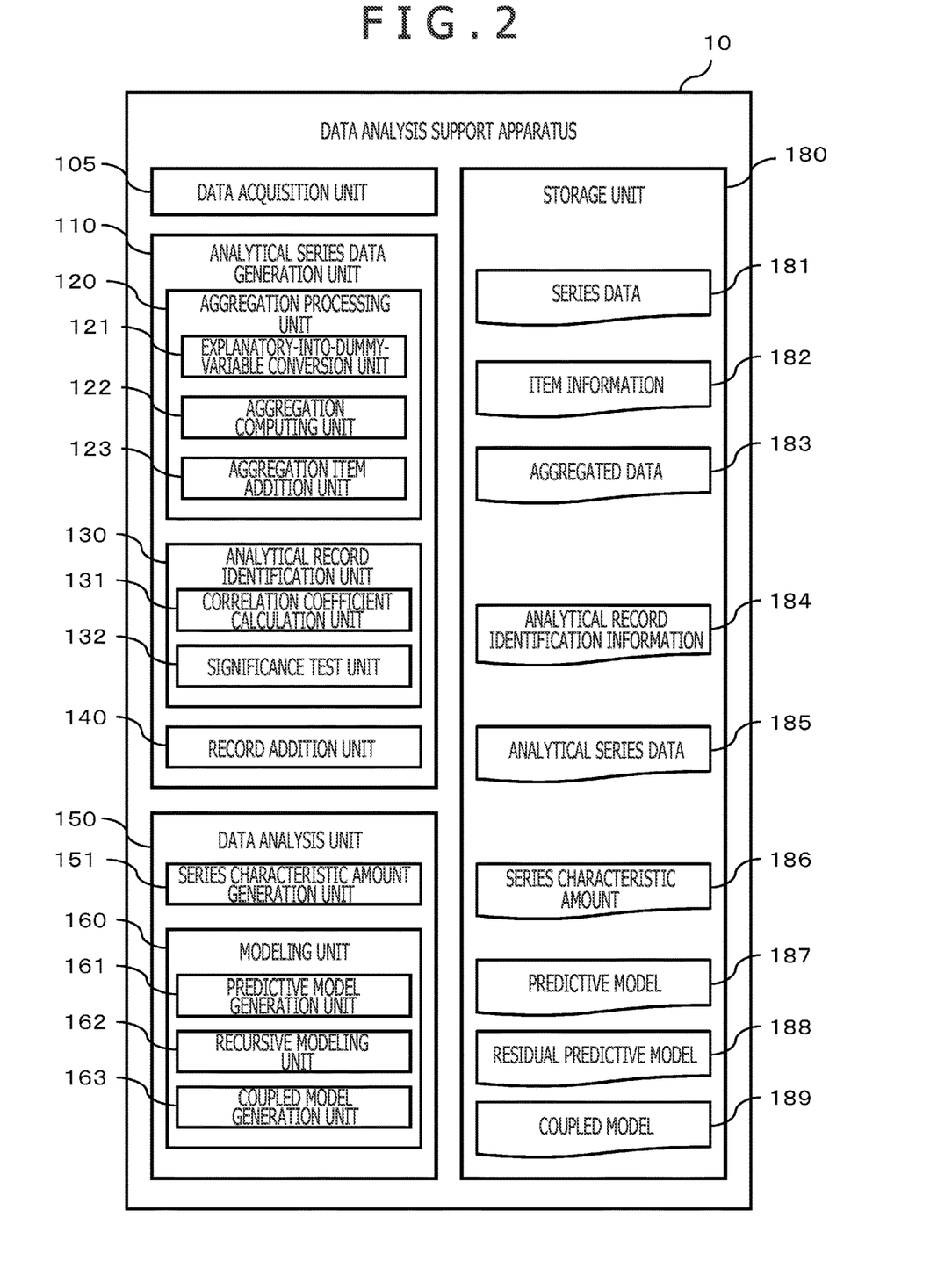
FIG. 2 illustrates principal functions provided in the data analysis support apparatus.

FIG. 2 illustrates principal functions (software configuration) with which the data analysis support apparatus 10 is equipped. As illustrated in FIG. 2, the data analysis support apparatus 10 includes such functions as a data acquisition section 110, an analytical series data generation unit 110, a data analysis unit 150, and a storage unit 180. These functions are realized by causing the processor 11 to read and execute the programs stored in the main storage device 12. The data analysis support apparatus 10 may include not only the above functions but also other functions, for example, an operating system, a file system, a device driver, and a database management system (DBMS). The data analysis support apparatus 10 stores various information (data) including the series data as, for example, tables and/or files in a database.

The storage unit 180 stores series data 181, item information 182, aggregated data 183, analytical record identification information 184, analytical series data 185, a series characteristic amount 186, a predictive model 187, a residual predictive model 188, and a coupled model 189. It is assumed that any of at least the series data 181, the aggregated data 183, and the analytical series data 185 among these pieces of data is managed in a table in a database as structured data.

Figure 3:
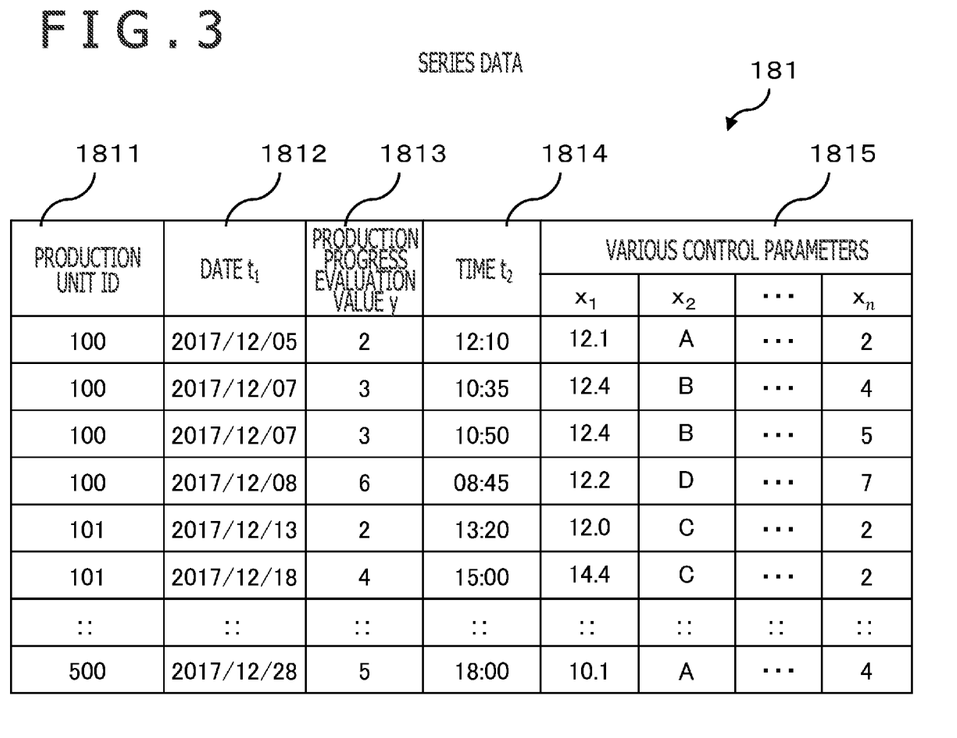
FIG. 3 illustrates an example of series data.

FIG. 3 illustrates an example of the series data 181. The series data 181 illustrated as an example includes log information in a factory production line and information about evaluation values related to produced products. As illustrated in FIG. 3, the series data 181 is configured with a plurality of records each having items (also referred to as "columns" or "fields") such as a production unit ID 1811, date $t_1$ 1812, a production progress evaluation value y 1813, time $t_2$ 1814, and various control parameters 1815.

To the production unit ID 1811 among these items, a production unit ID that is an identifier discriminating a unit of a record group (a lot, a running cycle of a manufacturing machine, or the like) is set. To the date $t_1$ 1812, time (a time stamp) at which the production progress evaluation value y 1813 was obtained is set. To the production progress evaluation value y 1813, an evaluation value of a production progress is set. To the time $t_2$ 1814, time at which various control parameters were set as objects to be controlled by the manufacturing machine or the like is set. To the various control parameters 1815, various control parameters ($x_1$, $x_2$, ..., $x_n$) such as a mixture ratio of materials that were set during production are set.

The series data 181 includes an item to which a value of a response variable is set in an analysis process performed by the data analysis unit 150, an item to which information identifying series of the response variable (hereinafter, referred to as "response variable series identification information") is set, an item to which a value of explanatory variable is set in the analysis process, and an item to which information identifying series of the explanatory variable (hereinafter, referred to as "explanatory variable series identification information") is set.

The item information 182 illustrated in FIG. 2 includes information that indicates which of the items in the series data 181 corresponds to each of the above items (the item to which the value of the response variable is set, the item to which the response variable series identification information is set, the item to which the value of the explanatory variable is set, and the item to which the explanatory variable series identification information is set). The data analysis support apparatus 10 acquires the item information 182 via, for example, the user interface configured using the input device 14 and the output device 15.

Figure 4:
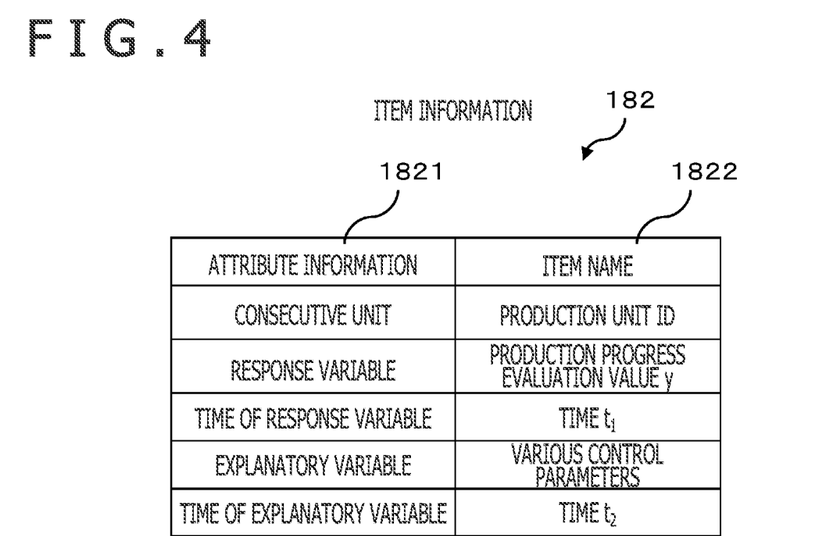
FIG. 4 illustrates an example of item information.

FIG. 4 illustrates an example of the item information 182. The item information 182 illustrated as an example contains a plurality of records each having attribute information 1821 and an item name 1822 associated with each other. To the attribute information 1821, information indicating an attribute (hereinafter, referred to as "attribute information") of each item in the series data 181 is set. To the item name 1822, a name of each item in the series data 181 is set.

Reference is made back to FIG. 2. Among the functions describe above, the analytical series data generation unit 110 generates the analytical series data 185 that is data obtained by adding records used at a time of analysis (hereinafter, referred to as "analytical record") of the series data 181 to the series data 181. The analytical records are generated on the basis of, for example, a viewpoint of associating (linking) past series of the response variable and a range of series of an explanatory variable, in relation to a value of the response variable, with each other. As illustrated in FIG. 2, the analytical series data generation unit 110 includes such functions as an aggregation processing unit 120, an analytical record identification unit 130, and a record addition unit 140.

Among these functions, the aggregation processing unit 120 includes an explanatory-into-dummy-variable conversion unit 121, an aggregation computing unit 122, and an aggregation item addition unit 123. The aggregation processing unit 120 generates the aggregated data 183 by performing an aggregation process, to be described later, with respect to the series data 181.

The analytical record identification unit 130 includes a correlation coefficient calculation unit 131 and a significance test unit 132. The analytical record identification unit 130 identifies, for example, records in the series data 181 that belong to a range of the series that influences a value of a predetermined response variable in the series data 181 at a time of data analysis, as the analytical records. Specifically, the analytical record identification unit 130 obtains a correlation coefficient of a correlation function between information contained in a predetermined record in the series data 181 and information contained in the other record in the series data 181, performs a test of significance of the obtained correlation coefficient, and identifies the analytical records on the basis of a result of the test. The correlation function is, for example, either an auto-correlation function or a partial auto-correlation function. The analytical record identification unit 130 generates information that identifies the analytical records in the series data 181 as the analytical record identification information 184. In a case in which the series data 181 contains a plurality of explanatory variables and in which a plurality of ranges of series of the explanatory variables that influence the value of the predetermined response variable are present, the analytical record identification unit 130 identifies analytical records for the plurality of explanatory variables that influence the value of the predetermined response variable.

Figure 5:
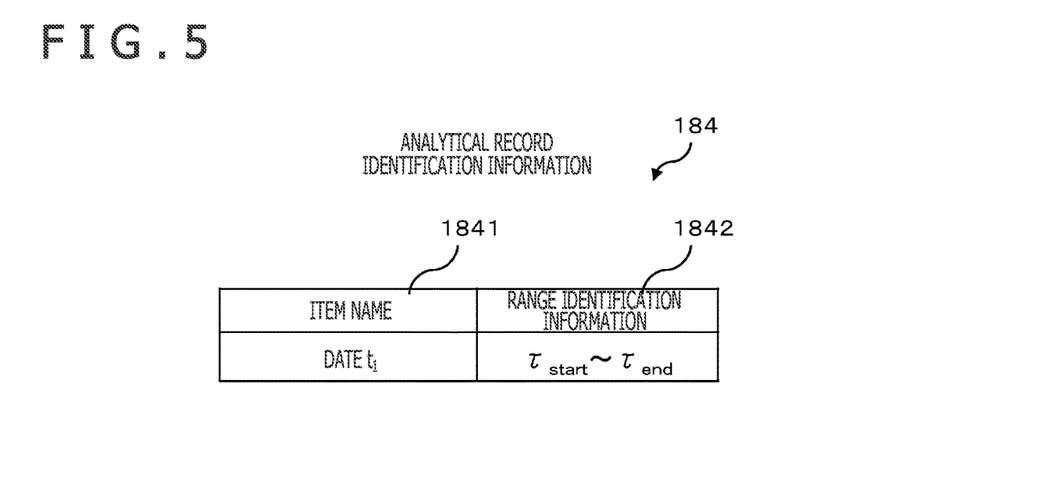
FIG. 5 illustrates an example of analytical record identification information.

FIG. 5 illustrates an example of the analytical record identification information 184. As illustrated in FIG. 5, the analytical record identification information 184 includes information that associates an item name 1841 in the series data 181 with range identification information 1842 that is information identifying a range of the analytical records on the basis of a value of the item name 1841. To the range identification information 1842, information identifying in the series data 181 a range of records used to generate the analytical records (range identification information by designation of a record number in the series data 181 or range identification information by designation of a time section of the item, to which the time is set, in the series data 181 (such as $\tau_{start} \sim \tau_{end}$)) is set.

Reference is made back to FIG. 2. The record addition unit 140 in the analytical series data generation unit 110 adds the analytical records to the series data 181 to generate the analytical series data 185. It is noted that the analytical series data generation unit 110 may generate the analytical series data 185 by directly editing a table of the series data 181 or may generate the analytical series data 185 as a table different from the table of the series data 181.

Figure 6:
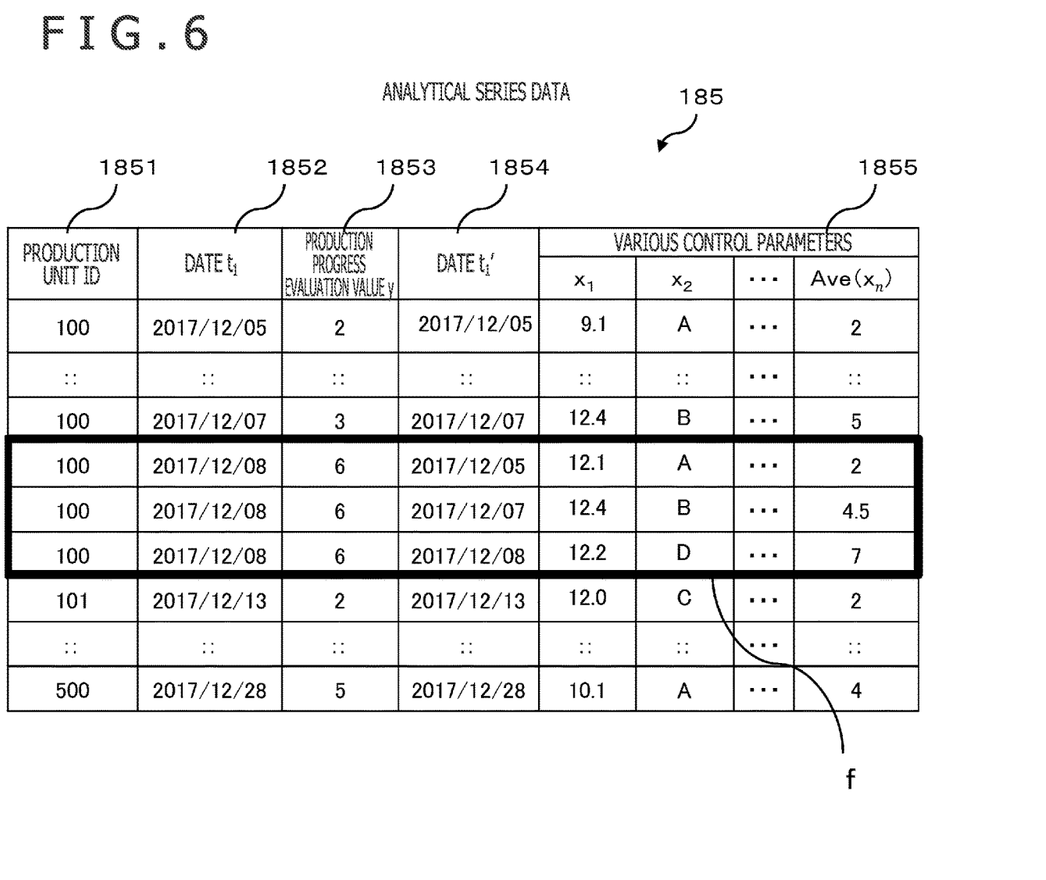
FIG. 6 illustrates an example of analytical series data.

FIG. 6 illustrates an example of the analytical series data 185. The analytical series data 185 illustrated in FIG. 6 is generated on the basis of the series data 181 of FIG. 3, the item information 182 of FIG. 4, and the analytical record identification information 184 of FIG. 5. As illustrated in FIG. 6, this analytical series data 185 is configured with a plurality of records each having items such as a production unit ID 1851, a date $t_1$ 1852, a production progress evaluation value y 1853, a date $t_1'$ 1854, and various control parameters 1855.

Among the above items, the items of the production unit ID 1851, the date $t_1$ 1852, and the production progress evaluation value y 1853 are similar to the production unit ID 1811, the date $t_1$ 1812, and the production progress evaluation value y 1813 of FIG. 3, respectively. To the date $t_1'$ 1854, a date identified on the basis of the date $t_1$ 1812 and the time $t_2$ 1814 of FIG. 3 is set. To the various control parameters 1855, the values of the various control parameters described above and/or a value obtained by aggregating the values of the various control parameters (such as an average value per day of the various control parameters) are set.

In FIG. 6, first and second records from the top out of three records surrounded by a thick frame f are the analytical records identified by the analytical record identification unit 130 and added by the record addition unit 140, and the first and second records are added with respect to the series data 181 of FIG. 3 for a value of the response variable "production progress evaluation value y=6" in the third record surrounded by the thick frame f of FIG. 6. The two added analytical records are obtained by associating a record of a content based on the date $t_1$ 1812 of "2017/12/05" and records of contents based on the date $t_1$ 1812 of "2017/12/07" in FIG. 3 with the value of the response variable "production progress evaluation value y=6" in the third record surrounded by the thick frame f of FIG. 6.

It is noted that in the example of FIG. 6, a range of the analytical records is limited to a range of containing an identical production unit ID 1811 designated as the consecutive unit in the item information 182. Furthermore, in FIG. 3, two records in which the date $t_1$ (reference character 1812) is "2012/12/07" are present, and a granularity (a unit in which a value is collected, and which is "day" that is an interval of acquisition of the value in the present example) of the series of the production progress evaluation value y 1813 that is the response variable differs from a granularity (a unit in which values are collected, and which is "minute" that is the interval of acquisition of the value in the present example) of the series of the various control parameters 1815 that are explanatory variables. Owing to this, the second record among the three records surrounded by the thick frame f has a content obtained by aggregating the above two records (it is noted that the two records in FIG. 3 are identical in values for $x_1$ and $x_2$ and the values are, therefore, adopted as they are in FIG. 6 while an average value (denoted by $Ave(x_n)$ in FIG. 6) of values in the two records is adopted for $x_n$). Since the item of the time $t_2$ 1814 indicating the time stamp of the various control parameters 1815 which are $x_n$ is unnecessary for data analysis, the item is excluded from the analytical series data 185.

Now, in a case in which the series data 181 has contents illustrated in FIG. 3, attention is paid to the record in which the production progress evaluation value y 1853 that is the response variable in FIG. 3 is "6." In conventional data analysis, only "$x_1$=12.2," "$x_2$=D," "$x_n$=7," and the like that are the values of the various control parameters 1815 in the record have been used as the explanatory variables. Actually, however, values of explanatory variables in records before the record of interest, rates of change thereof, and the like often influence the response variable. The data analysis support apparatus 10 of the present embodiment, by contrast, generates the analytical series data 185 by adding the analytical records associated with the value of the predetermined response variable to the series data 181 as illustrated in FIG. 6, and performs data analysis on the basis of the analytical series data 185. Therefore, the data analysis support apparatus 10 performs extraction of the series characteristic amount and the other processes in the light of the values of the explanatory variables and the rates of change thereof that actually influence the response variable; thus, the data analysis support apparatus 10 can perform the data analysis with high accuracy. While a case in which factors possibly influencing the response variable are the explanatory variables has been exemplarily described so far, there is a case in which the factors possibly influencing the response variable are past values of the response variable. In that case, the data analysis support apparatus 10 generates the analytical records on the basis of a record containing the past values of the response variable that possibly influence the value response variable of interest.

Reference is made back to FIG. 2. Among the functions described above, the data analysis unit 150 performs data analysis on the basis of the analytical series data 185 generated by the analytical series data generation unit 110. As illustrated in FIG. 2, the data analysis unit 150 includes a series characteristic amount generation unit 151 and a modeling unit 160. The series characteristic amount generation unit 151 generates the series characteristic amount 186 on the basis of the analytical series data 185. Details of the series characteristic amount generation unit 151 will be described later. The modeling unit 160 generates the predictive model 187, the residual predictive model 188, and the coupled model 189 on the basis of the series characteristic amount 186. As illustrated in FIG. 2, the modeling unit 160 includes a predictive model generation unit 161, a recursive modeling unit 162, and a coupled model generation unit 163. Details of the modeling unit 160 will be described later.

Figure 7:
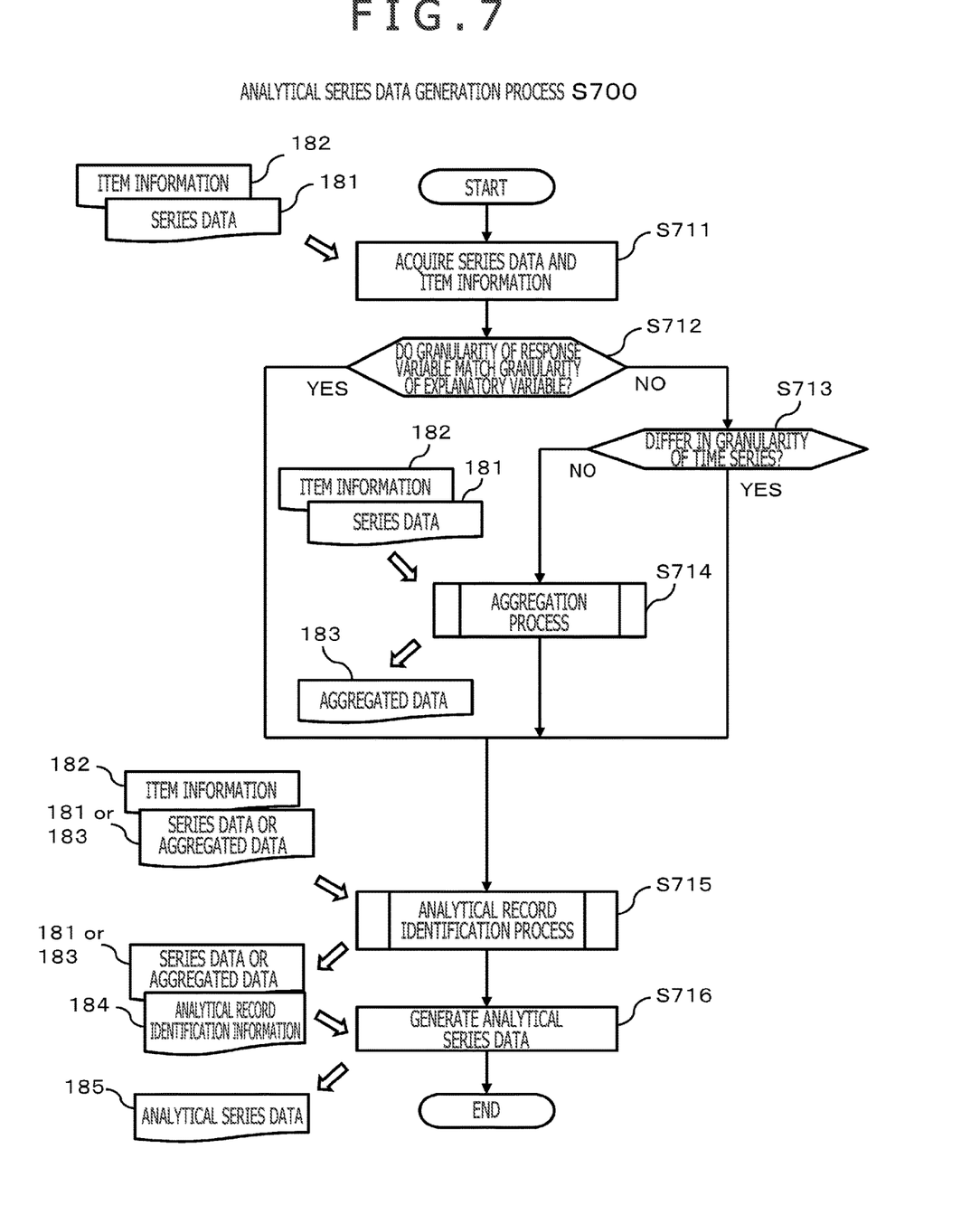
FIG. 7 is a flowchart for describing an analytical series data generation process.

FIG. 7 is a flowchart for describing a process performed by the analytical series data generation unit 110 (hereinafter, referred to as "analytical series data generation process S700"). The analytical series data generation process S700 will now be described with reference to FIG. 7.

First, the analytical series data generation unit 110 acquires the series data 181 and the item information 182 from the storage unit 180 (S711).

The analytical series data generation unit 110 then determines whether the granularity of the series of the response variable designated in the item information 182 for the series data 181 matches the granularity of the series of the explanatory variable (S712). In a case in which the analytical series data generation unit 110 determines that the granularities do not match (S712: NO), the process goes to S713. In a case in which the analytical series data generation unit 110 determines that the granularities match (S712: YES), the process goes to S715.

In S713, the analytical series data generation unit 110 determines whether the response variable and the explanatory variable differ in the granularity of "time series" (whether a cause for difference in granularity results from a difference in time series of obtaining data). In a case in which the analytical series data generation unit 110 determines that the response variable and the explanatory variable differ in the granularity of an item other than the time series (S713: NO), the process goes to S714 for aggregating the series data 181. In a case in which the analytical series data generation unit 110 determines that the response variable and the explanatory variable differ in the granularity of the time series (S713: YES), there is no need to aggregate the series data 181 and the process, therefore, goes to S715.

Figure 8:
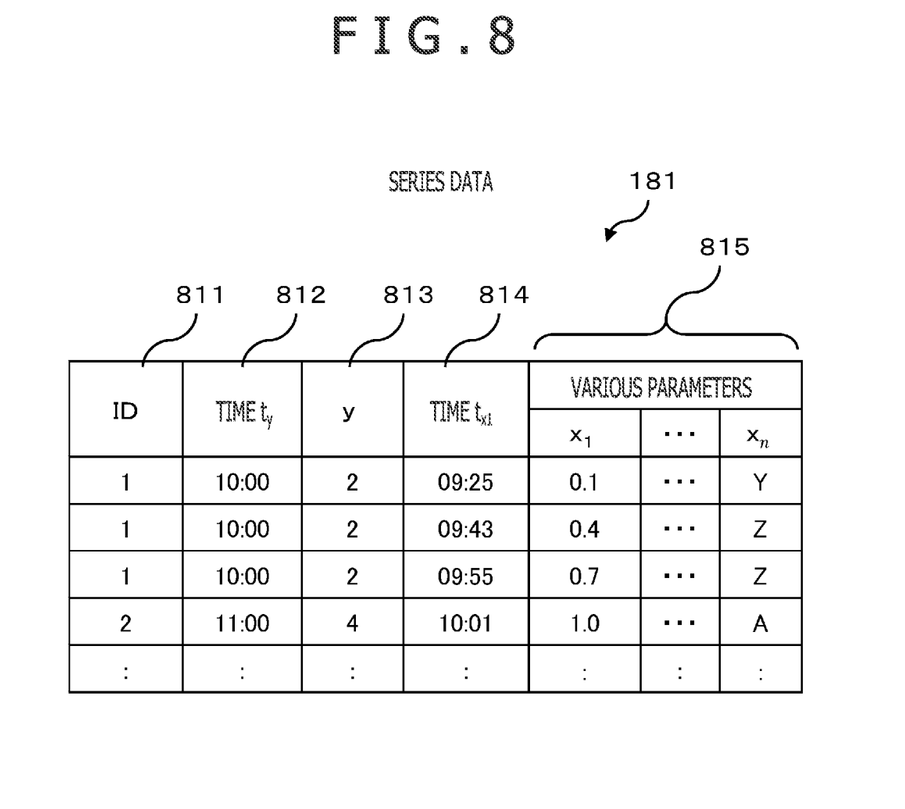
FIG. 8 illustrates an example of series data.

FIG. 8 illustrates an example of the series data 181 in which the response variable and the explanatory variable differ in the granularity of the "time series." As illustrated in FIG. 8, the series data 181 illustrated as an example is configured with a plurality of records each having items such as an ID 811, time $t_y$ 812, a y 813, time $t_{x1}$ 814, and various parameters 815. To the ID 811, a related identifier of a record group such as the production unit is set. To the time $t_y$ 812, time at which a value of the y 813 that is the response variable was acquired is set. To the y 813, the value of the response variable is set. To the time $t_{x1}$ 814, time at which $x_1$ that is one of the explanatory variables was acquired is set. To the various parameters 815, values of various parameters that are the explanatory variables ($x_1, x_2, \ldots, x_n$) are set. As illustrated in FIG. 8, in this example, the granularity of the time series of the response variable (granularity of the time $t_y$ 812) differs from the granularity of the time series of the explanatory variable (time $t_{x1}$ 1814) in three records in which a value of the ID 811 is "1." In a case in which the response variable and the explanatory variable differ in the granularity of the "time series" as in the present example, there is no hindrance to identifying the analytical record and the series data 181 is not, therefore, subjected to aggregation.

Reference is made back to FIG. 7. In S714, the aggregation processing unit 120 performs a process for causing the response variable and the explanatory variable to match each other in the granularity of the item other than the time series (hereinafter, referred to as "aggregation process S714") for the series data 181.

Figure 9:
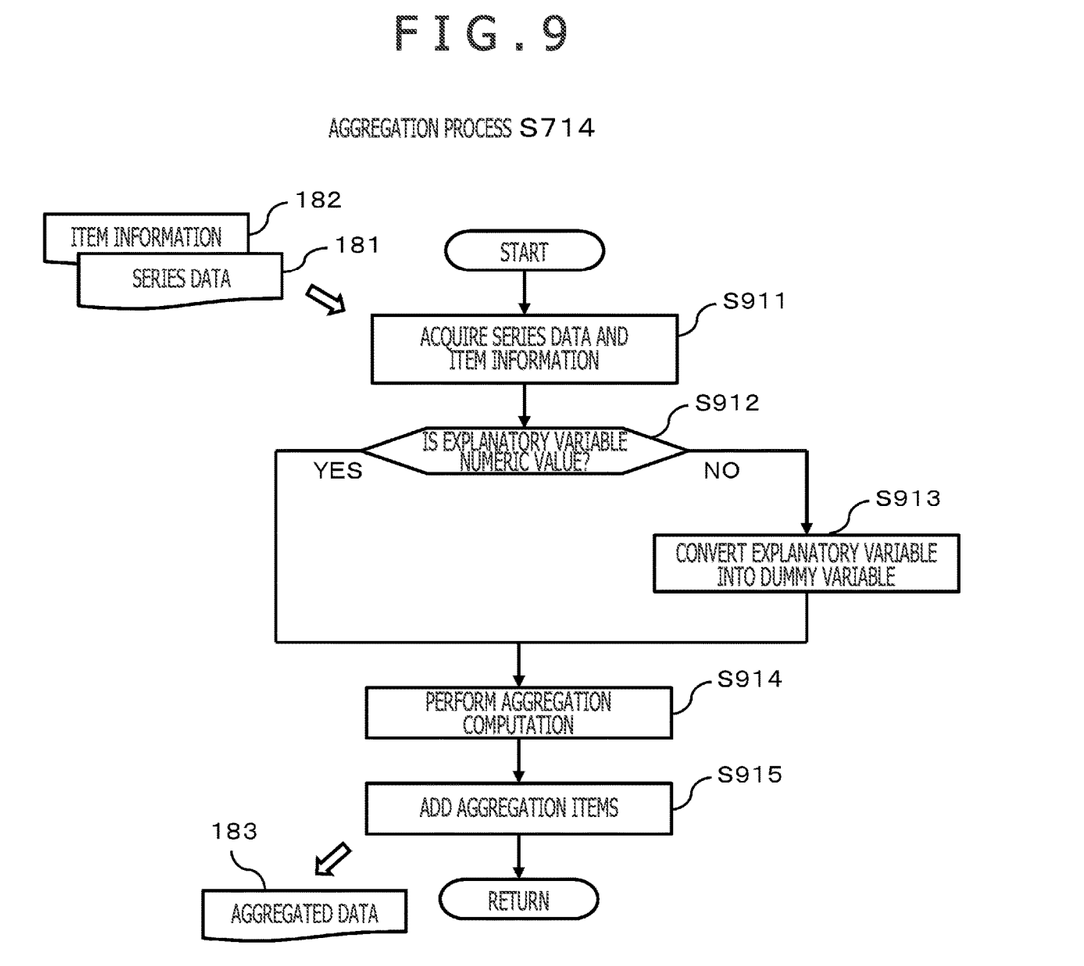
FIG. 9 is a flowchart for describing an aggregation process.

FIG. 9 is a flowchart for describing the aggregation process S714 of FIG. 7. The aggregation process S714 will now be described with reference to FIG. 9.

First, the aggregation processing unit 120 acquires the series data 181 and the item information 182 from the storage unit 180 (S911).

Next, the aggregation processing unit 120 determines in the series data 181 whether a value of the item defined as the explanatory variable in the item information 182 is a numeric value (S912). In a case in which the aggregation processing unit 120 determines that the value of the item defined as the explanatory variable in the item information 182 is the numeric value (S912: YES), the process goes to S914. In a case in which the aggregation processing unit 120 determines that the value of the item defined as the explanatory variable in the item information 182 is not the numeric value (S912: NO), the process goes to S913 for converting the explanatory variable into a dummy variable.

In S913, the explanatory-into-dummy-variable conversion unit 121 converts the explanatory variable determined not to be the numeric value into the dummy variable. In the example of FIG. 6, the explanatory-into-dummy-variable conversion unit 121 converts the variable "$x_n$" into a variable "Ave ($x_n$)" storing the average value. Alternatively, a variable storing, for example, any of representative values of other types (such as an addition value, a variance, a count value, a maximum value, and a minimum value) other than the average value may be used as the dummy variable. In a case of the series data 181 of FIG. 3 and the item information 182 of FIG. 4, the explanatory variable is the various control parameters 1815 and the various control parameters 1815 include a plurality of variables ($x_1, x_2, \ldots$, and $x_n$). Owing to this, the aggregation processing unit 120 determines whether the value of each variable is a numeric value and, in this case, performs processes in S912 and S913.

In S914, the aggregation computing unit 122 performs computation necessary for aggregation with respect to the explanatory variable (for example, calculation of the average value of the explanatory variable in a plurality of records or calculation of an appearance frequency of a predetermined explanatory variable in a plurality of records).

In S915, the aggregation item addition unit 123 adds an item (aggregation item) storing a result obtained by the aggregation computing unit 122 to the series data 181 to generate the aggregated data 183.

Figure 10:
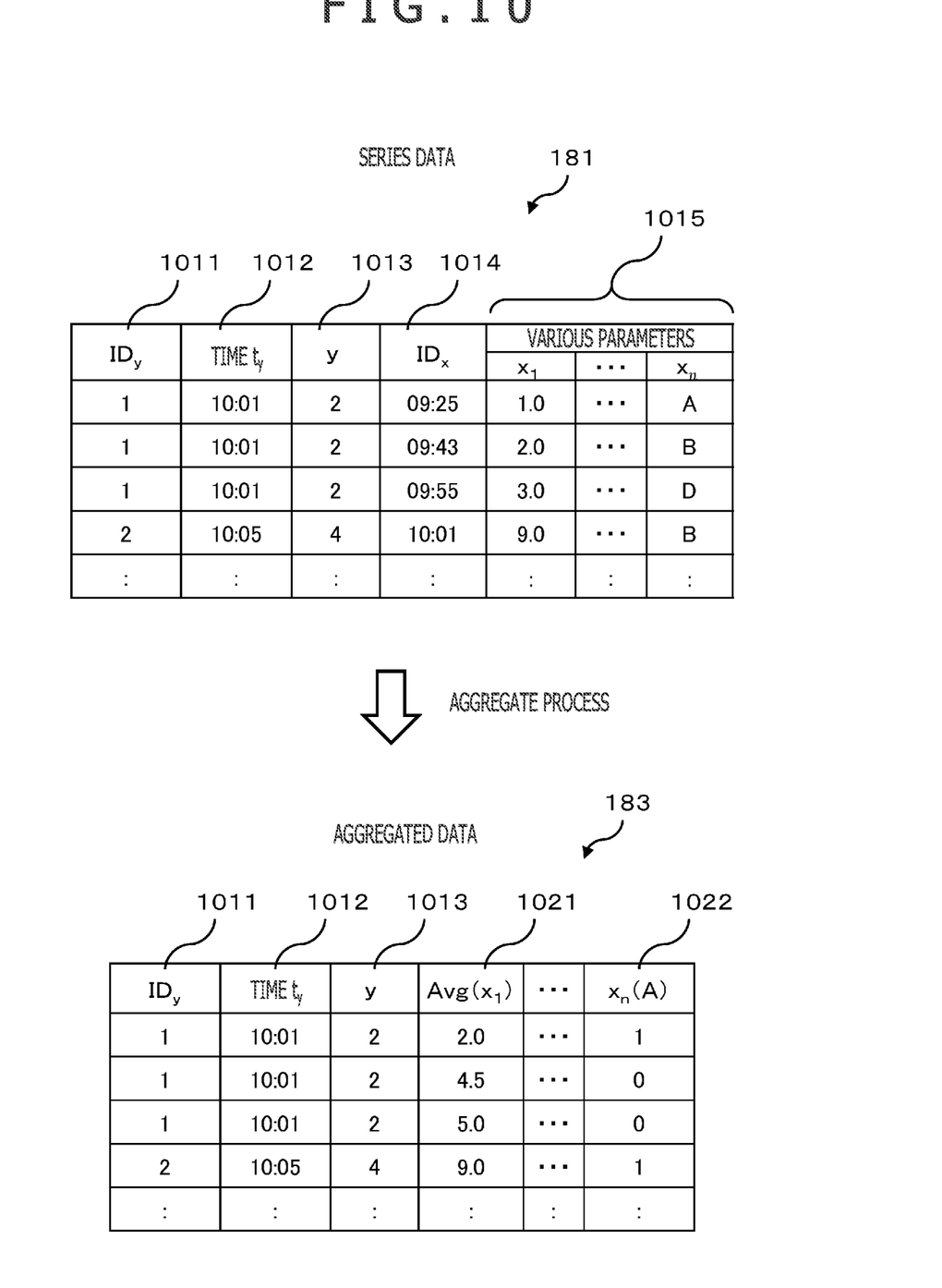
FIG. 10 illustrates an example of generation of aggregated data based on series data.

FIG. 10 illustrates an example of the series data 181 in which the response variable and the explanatory variables differ in the granularity of the item other than the time series, and the aggregated data 183 generated by performing the aggregation process S714 for the series data 181.

As illustrated in FIG. 10, the series data 181 illustrated as an example is configured with a plurality of records each having items such as an $ID_y$ 1011, time $t_y$ 1012, a y 1013, an $ID_x$ 1014, and various parameters 1015.

To the $ID_y$ 1011, a related identifier of a record group for the response variable is set. To the time $t_y$ 1012, time at which the y 1013 that is the response variable was acquired is set. To the y 1013, a value of the response variable is set. To the $ID_x$ 1014, a related identifier of a record group for the explanatory variable is set. To the various parameters 1015, values of various parameters that are explanatory variables ($x_1, x_2, \ldots$, and $x_n$) are set.

As illustrated in FIG. 10, in this example, the granularity of the series of the $ID_y$ 1011 for the response variable differs from the granularity of the series of the $ID_x$ 1014 for the explanatory variable. Therefore, to cause the granularity of the series of the response variable and the granularity of the series of the explanatory variable to match each other, the aggregation processing unit 120 converts the explanatory variable $x_1$ into a dummy variable Ave($x_1$) to which an average value of the explanatory variable $x_1$ is set, and converts the explanatory variable $x_n$ into a dummy variable $x_n$(A) to which an appearance frequency of a value "A" in the explanatory variable $x_n$ is set.

Reference is made back to FIG. 7. In S715, the analytical record identification unit 130 performs a process for identifying the analytical record (hereinafter, referred to as "analytical record identification process S715") on the basis of the series data 181 or the aggregated data 183 as well as the item information 182 to generate the analytical record identification information 184.

Figure 11:
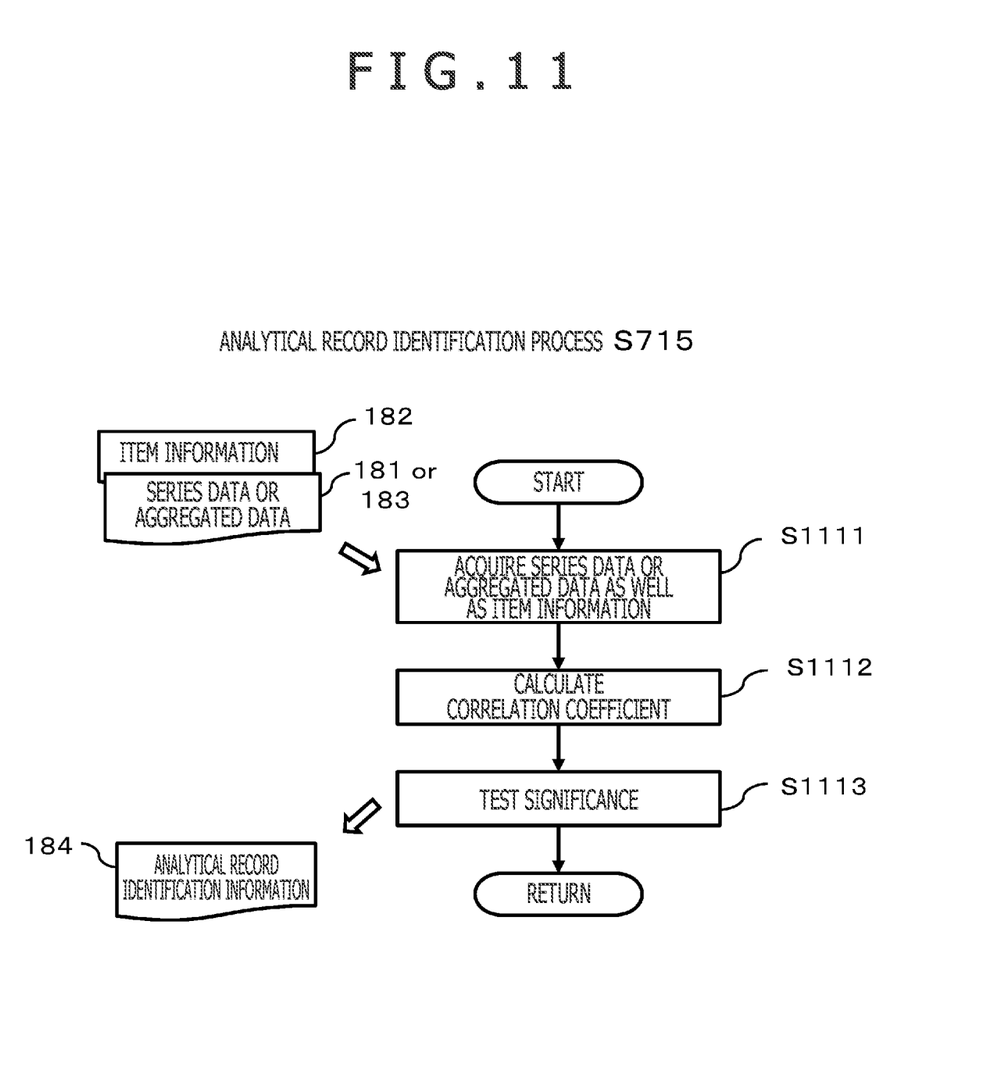
FIG. 11 is a flowchart for describing an analytical record identification process.

FIG. 11 is a flowchart for describing the analytical record identification process S715. The analytical record identification process S715 will now be described with reference to FIG. 11.

First, the analytical record identification unit 130 acquires the series data 181 or the aggregated data 183 as well as the item information 182 from the storage unit 180 (S1111).

Next, the correlation coefficient calculation unit 131 obtains the correlation coefficient (for example, the auto-correlation coefficient or the partial auto-correlation coefficient) of the correlation function (for example, an auto-correlation function or a partial auto-correlation function) that indicates a relationship between the explanatory variable and the response variable for the series data 181 or the aggregated data 183 (S1112).

Next, the significance test unit 132 performs a test of significance of the correlation coefficient obtained in S1112, and generates the analytical record identification information 184 on the basis of a result of the test (S1113). For example, the correlation coefficient calculation unit 131 obtains a partial correlation coefficient at a time of delaying the series one by one (generating Lags) (S1112), extracts the significantly correlating Lags, and generates the analytical record identification information 184 on the basis of the extracted Lags (S1113).

It is noted that a method of identifying the analytical records is not limited to the above method. For example, a range of the explanatory variable that influences the response variable may be identified by evaluating the trade-off between model complexity and prediction accuracy using the Akaike's information criterion, and the analytical record identification information 184 may be generated on the basis of a result of identification.

Reference is made back to FIG. 7. In S716, the record addition unit 140 generates the analytical records on the basis of the series data 181 or the aggregated data 183 as well as the analytical record identification information 184, and adds the generated analytical records to the series data 181, thereby generating the analytical series data 185 (S716).

Figure 12:
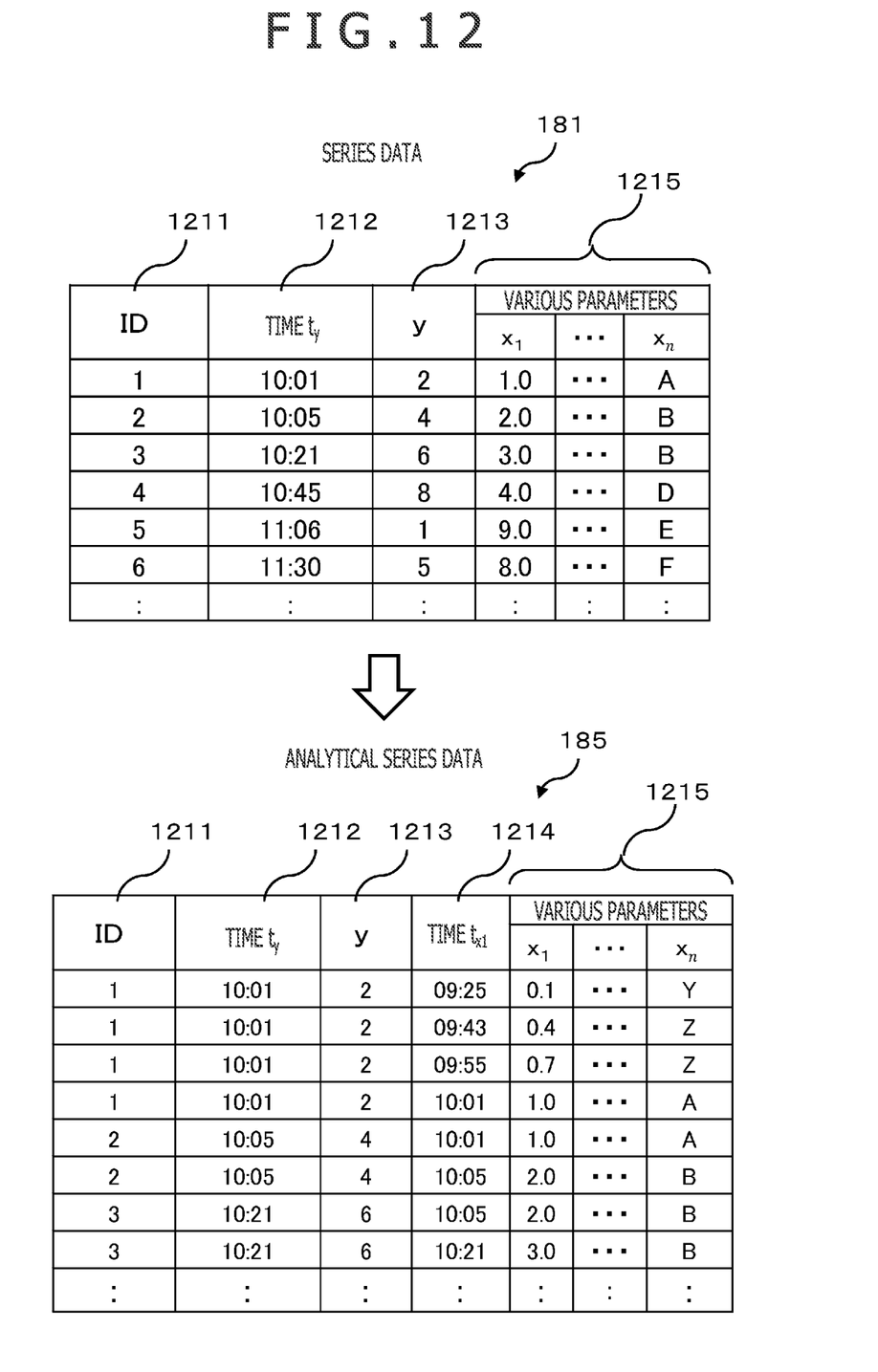
FIG. 12 illustrates an example of generation of analytical series data based on series data.

FIG. 12 is an illustrative diagram of a state in which the analytical records identified by the analytical record identification information 184 are added to the series data 181 to generate the analytical series data 185 by the analytical series data identification process S700 described above. As illustrated in FIG. 12, the series data 181 illustrated as an example is configured with a plurality of records each having items such as an ID 1211, time $t_y$ 1212, a y 1213, and various parameters 1215. To the ID 1211, an identifier that discriminates a unit of a record group is set. To the time $t_y$ 1212, time at which the value of the y 1213 that is the response variable was acquired is set. To the y 1213, the value of the response variable is set. To the various parameters 1215, the values of various parameters that are explanatory variables ($x_1, x_2, \ldots,$ and $x_n$) are set.

The analytical series data 185 illustrated in FIG. 12 is data generated on the basis of the series data 181 depicted in FIG. 12. As illustrated in FIG. 12, the analytical series data 185 is configured with a plurality of records each having items of the ID 1211, the time $t_y$ 1212, the y 1213, time $t_{x1}$ 1214, and the various parameters 1215. The items of the ID 1211, the time $t_y$ 1212, the y 1213, and the various parameters 1215 are similar to those in the series data 181. To the time $t_{x1}$ 1214, time at which "$x_1$" which is one of the explanatory variables was acquired is set. In this example, three records in first to third rows of the analytical series data 185 are added as the analytical records for a value "2" of the y 1213 that is the response variable in the series data 181. Furthermore, for example, a fifth record in the analytical series data 185 is added as the analytical record for a value "4" of the y 1213 that is the response variable in the series data 181.

The analytical series data 185 is data having a redundant content since the analytical series data 185 contains analytical records including the data considered to influence the response variable. However, a data structure table form) of the analytical series data 185 complies with a data structure (table form) demanded by an ordinary analysis algorithm in, for example, machine learning; thus, it is possible to pursue the analysis process easily and promptly by using the analytical series data 185 as it is or performing minimum preprocessing thereon.

As described so far, according to the data analysis support apparatus 10 of the present embodiment, the analytical series data generation unit 110 executes the analytical series data generation process S700, thereby automatically generating the analytical series data 185 obtained by adding the analytical records to the series data 181. Owing to this, it is possible, for example, for the analyst to easily and promptly obtain the data necessary for data analysis and efficiently perform analysis work only by inputting the series data 181 and the item information 182 to the data analysis support apparatus 10.

The analytical series data 185 is generated by adding the analytical records to the series data 181 in the above description. Alternatively, the analytical series data generation unit 110 may generate and store only the analytical record identification information 184 and the analytical records without generating the analytical series data 185, and may generate all of or part of the analytical series data 185 using the series data 181 and the analytical record identification information 184 or the analytical records at timing at which, for example, the analytical series data 185 is necessary at the timing of data analysis. This enables effective use of storage resources (main storage device 12 and auxiliary storage device 13).

As described above, the data analysis support apparatus 10 includes the data analysis unit 150 that performs data analysis using the analytical series data 185. A process performed by the data analysis unit 150 will now be described.

Figure 13:
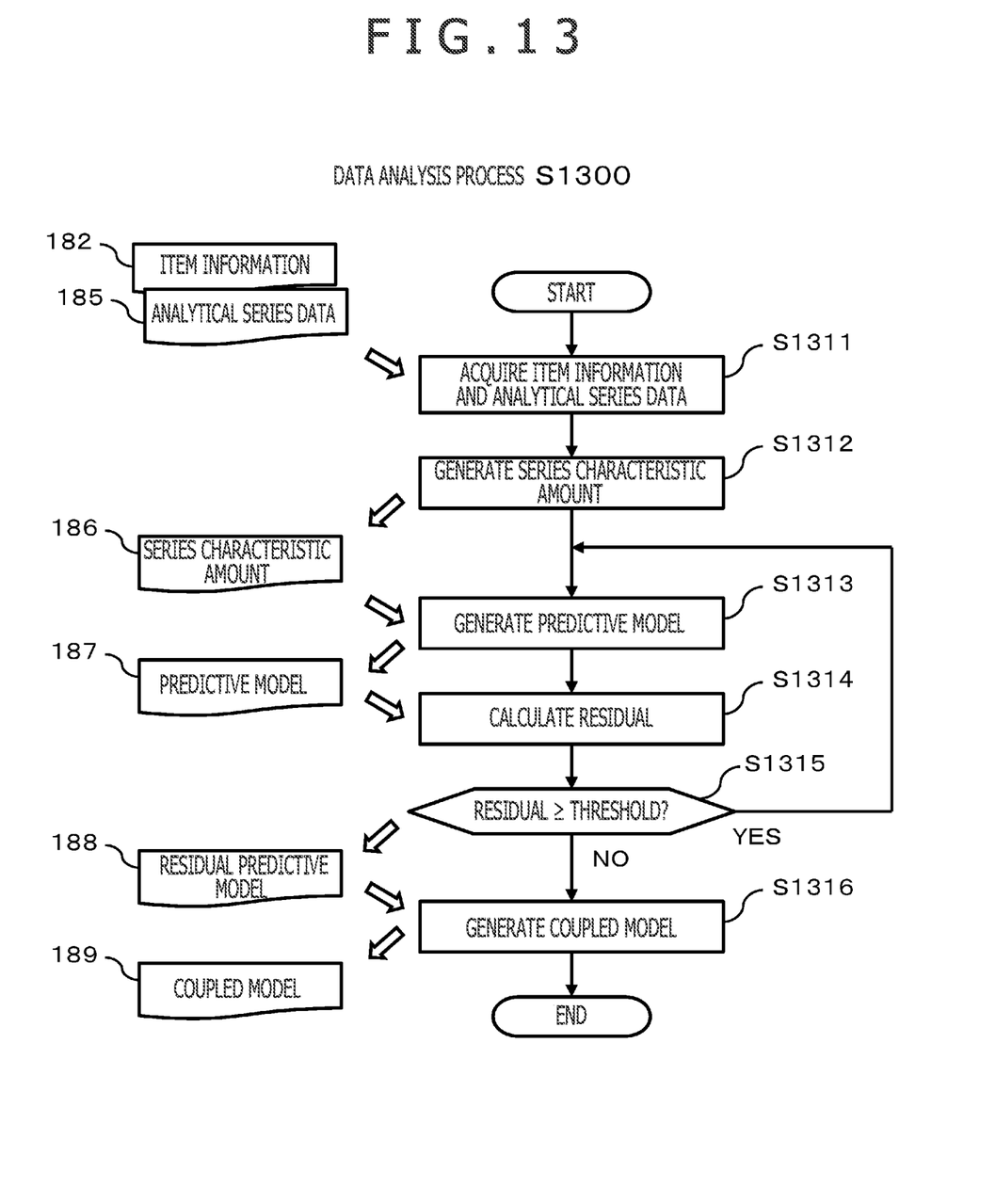
FIG. 13 is a flowchart for describing a data analysis process.

FIG. 13 is a flowchart for describing the process performed by the data analysis unit 150 (hereinafter, referred to as "data analysis process S1300"). The data analysis process S1300 will now be described with reference to FIG. 13.

First, the data analysis unit 150 acquires the item information 182 and the analytical series data 185 from the storage unit 180 (S1311).

Next, the series characteristic amount generation unit 151 generates the series characteristic amount 186 on the basis of the item information 182 and the analytical series data 185 (S1312). The series characteristic amount generation unit 151 generates the series characteristic amount 186 by, for example, a method of calculating a representative value (such as a difference in a value of a predetermined item among the records (primary differentiation, secondary differentiation), an accumulated value of the value of the predetermined item of the records, an average value of the value of the predetermined item of the records, or a maximum value of records within a predetermined section) or a method of performing basis change by Fourier transform or the like.

Next, the predictive model generation unit 161 in the modeling unit 160 receives the series characteristic amount 186 as an input and generates the predictive model 187 that explains the response variable (S1313). The predictive model generation unit 161 can generate the predictive model 187 using, for example, any of various modeling approaches in the machine learning. Examples of the approaches for generating the predictive model 187 include those based on multiple linear regression analysis, support vector regression (SVR), Random Forest Regression, and Gaussian process (GP) in a case in which the response variable is continuous numbers, and include those based on Logistic regression and SVM (Support Vector Machine) in a case of classification. There is also known an approach based on autoregressive integrated moving average (ARIMA) as an approach for generating the predictive model specific to time series analysis.

Next, the recursive modeling unit 162 in the modeling unit 160 compares a predicted value based on the predictive model 187 generated in S1313 with a predicted value of the response variable in the analytical series data 185 acquired in S1311, obtains a difference between the predicted values (hereinafter, referred to as "residual") (S1314), and determines whether the residual is equal to or higher than a predetermined threshold (S1315). The threshold is set to, for example, a noise level of the response variable in the analytical series data 185. In a case in which the recursive modeling unit 162 determines that the residual is equal to or higher than the threshold (S1315: YES), then the process returns to S1313, and the predictive model generation unit 161 receives the residual as an input (response variable) to generate the residual predictive model 188. The recursive modeling unit 162 recursively and repeatedly executes the process in S1313 to S1315 by one or more loops. In a case in which the recursive modeling unit 162 determines that the residual is lower than the threshold (S1315: NO), the process goes to S1316.

In S1316, the coupled model generation unit 163 in the modeling unit 160 couples the predictive model 187 and one or more residual predictive models 188 generated per loop from S1313 to S1315 to each other to generate the coupled model 189. It is noted that examples of a method of generating the coupled model 189 include a method of generating the coupled model 189 by linearly coupling the predictive model 187 to the one or more residual predictive models 188, and a method of generating the coupled model 189 by multiplying the predictive model 187 by the one or more residual predictive models 188.

As described so far, the data analysis support apparatus 10 according to the present embodiment can automatically generate the analytical series data 185, and can automatically generate the series characteristic amount 186, the predictive model 187, and the coupled model 189 for the generated analytical series data 185. Owing to this, the preprocessing and data analysis on the series data 181, for example, do not require high level expertise. Even in a case in which, for example, a person with lack of expertise in transformation of string data performs data analysis, the person can perform highly accurate data analysis easily and promptly. Moreover, it is possible to greatly shorten time required for preprocessing such as data transformation considered to make up most of the analysis process.

While the present invention has been specifically described on the basis of the embodiment, it is needless to say that the present invention is not limited to the embodiment described above and various changes and modifications can be made within the scope of the spirit of the invention. For example, the embodiment described has been described in detail so that the present invention is easy to understand, and the present invention is not always limited to one having all the described configurations. Moreover, for a part of the configuration of the embodiment, addition, deletion, and/or replacement of the other configuration can be made.

Furthermore, configurations, functional sections, processing sections, processing means, and the like described above may be realized by hardware by, for example, designing a part or all thereof with integrated circuits. Moreover, the configurations, functions, and the like described above may be realized by software by causing the processor to interpret and execute programs that realize the respective functions. Information about the programs, the tables, the files, and the like that realize the functions can be placed in a recording device such as a memory, a hard disk, or a solid state drive (SSD) or in a recording medium such as an IC card, an SD card, or a DVD.

Furthermore, control lines or information lines considered to be necessary for the description are illustrated in the drawings referred to above and all the control lines or the information lines for implementation are not always illustrated. For example, it may be considered that almost all the configurations are actually and mutually connected.

Moreover, a form of disposing various functional units, various processing units, and various databases of the data analysis support apparatus 10 described so far is given as an example only. The form of disposing the various functional units, the various processing units, and the various databases can be changed to an optimum form of disposition from the viewpoint of performance of hardware and software provided in the data analysis support apparatus 10, processing efficiency, communication efficiency, and the like.

Furthermore, a configuration (schema and the like) of the various databases described above can be flexibly changed from the viewpoint of effective use of resources, improvement of the processing efficiency, improvement of access efficiency, improvement of retrieval efficiency, and the like.

Although the present disclosure has been described with reference to exemplary embodiments, those skilled in the art will recognize that various changes and modifications may be made in form and detail without departing from the spirit and scope of the claimed subject matter.

What is claimed is:

1. A data analysis support apparatus that is an information processing apparatus, the data analysis support apparatus comprising:
a processor coupled to a memory,
wherein the memory stores series data in a table which includes a plurality of records and reach record has a plurality of items including respective values associated with a response variable, response variable series identification information that is information identifying a series of the response variable, an explanatory variable, and explanatory variable series identification information that is information identifying a series of the explanatory variable,
wherein the plurality of items of each record of the series data in the table further includes a time at which the response variable was obtained and a time at which the explanatory variable was obtained,
wherein the memory stores instructions that when executed by the processor configure the processor to:
identify an analytical record of the plurality of records of the series data that contains the value of the response variable or the value of the explanatory variable determined to possibly influence the response variable at a time of analyzing the response variable,
generate an additional record which is a record having the value of the response variable or the value of the explanatory variable in the identified analytical record associated with the value of the response variable in a predetermined record among the plurality of records of the series data, and generate analytical series data which is data obtained by adding the generated additional record to the series data, and
determine whether a granularity of the explanatory variable in the series data and a granularity of the response variable in the series data differ from one another on the basis of an item among the plurality of items other than the time at which the response variable was obtained and the time at which the explanatory variable was obtained, and upon determining the granularity of the explanatory variable in the series data and the granularity of the response variable in the series data differ from one another on the basis of the item among the plurality of items other than the time at which the response variable was obtained and the time at which the explanatory variable was obtained, generate aggregated data which is data obtained by aggregating the values of the explanatory variable for the series data, and
wherein the analytical record is identified based on the aggregated data.

2. The data analysis support apparatus according to claim 1,
wherein the processor is configured to: identify the analytical record on the basis of a correlation coefficient of a correlation function between information contained in the predetermined record and information contained in the other records in the series data.

3. The data analysis support apparatus according to claim 2,
wherein the correlation function is an auto-correlation function or a partial auto-correlation function.

4. The data analysis support apparatus according to claim 2,
wherein the processor is configured to: perform a test of significance of the correlation coefficient and identifies the analytical record on the basis of a result of the test.

5. The data analysis support apparatus according to claim 1,
wherein the additional record contains the response variable series identification information associated with the value of the response variable in the additional record or the explanatory variable series identification information associated with the value of the explanatory variable in the additional record.

6. The data analysis support apparatus according to claim 1,
wherein the series data is time series data.

7. The data analysis support apparatus according to claim 6,
wherein the response variable series identification information is information that indicates time of acquisition of the response variable, and
wherein the explanatory variable series identification information is information that indicates time of acquisition of the explanatory variable.

8. The data analysis support apparatus according to claim 1,
wherein the processor is configured to receive information identifying, for the series data, an item to which the value of the response variable is set, an item to which the response variable series identification information is set, an item to which the value of the explanatory variable is set, and an item to which the explanatory variable series identification information is set.

9. The data analysis support apparatus according to claim 1,
wherein the processor is configured to generate a series characteristic amount on the basis of the analytical series data.

10. The data analysis support apparatus according to claim 9,
wherein the processor is configured to execute a predictive model generation process for generating a predictive model of the response variable on the basis of the series characteristic amount.

11. The data analysis support apparatus according to claim 10,
wherein the processor is configured to: recursively execute a residual calculation process for calculating a residual that is a difference between a predicted value based on the predictive model and the value of the response variable in the series data, and the predictive model generation process performed by setting the residual to the response variable until the residual is equal to or lower than a predetermined threshold, thereby generating a residual predictive model that is a model for predicting the residual.

12. The data analysis support apparatus according to claim 11,
wherein the process is configured to: generate a coupled model which is a model obtained by combining the generated predictive model with a plurality of the residual predictive models.

13. A data analysis support method, causing
an information processing apparatus having a processor and a storage device to execute:
a step of storing series data in a table, which includes a plurality of records and each record has a plurality of items including respective values associated with a response variable, response variable series identification information that is information identifying a series of the response variable, explanatory variable, and explanatory variable series identification information that is information identifying a series of the explanatory variable, wherein the plurality of items of each record of the series data in the table further includes a time at which the response variable was obtained and a time at which the explanatory variable was obtained;
identifying an analytical record of the plurality of records of the series data that contains the value of the response variable or the value of the explanatory variable determined to possibly influence the response variable at a time of analyzing the response variable;
generating an additional record which is a record having the value of the response variable or the value of the explanatory variable in the identified analytical record associated with the value of the response variable in a predetermined record that is any of the records, and generating analytical series data which is data obtained by adding the generated additional record to the series data; and
determining whether a granularity of the explanatory variable in the series data and a granularity of the response variable in the series data differ from one another on the basis of an item among the plurality of items other than the time at which the response variable was obtained and the time at which the explanatory variable was obtained, and upon determining the granularity of the explanatory variable in the series data and the granularity of the response variable in the series data differ from one another on the basis of the item among the plurality of items other than the time at which the response variable was obtained and the time at which the explanatory variable was obtained, generating aggregated data which is data obtained by aggregating the values of the explanatory variable for the series data, and
wherein the analytical record is identified based on the aggregated data.

* * * * *